United States Patent [19]

Kennedy, Jr.

[11] Patent Number: 5,018,297
[45] Date of Patent: May 28, 1991

[54] AUDIBLE FISHING LURE

[75] Inventor: Michael B. Kennedy, Jr., Lakeland, Fla.

[73] Assignee: Wild Tails, Inc., Lakeland, Fla.

[21] Appl. No.: 490,470

[22] Filed: Mar. 8, 1990

[51] Int. Cl.$^5$ ............................................. A01K 85/00
[52] U.S. Cl. .................................. 43/42.28; 43/42.31; 43/42.53; 43/42.06
[58] Field of Search ................. 43/42.31, 42.06, 42.28, 43/42.53, 42.36, 42.24, 42.37

[56] References Cited

U.S. PATENT DOCUMENTS

| | | | |
|---|---|---|---|
| 1,640,599 | 8/1927 | Conn | 43/42.53 |
| 2,365,502 | 12/1944 | Weesner | 43/42.28 |
| 3,021,632 | 2/1962 | Gombar | 43/42.28 |
| 3,864,864 | 2/1975 | Duescher | 43/42.53 |
| 4,015,363 | 4/1977 | Sedlak | 43/42.31 |
| 4,736,542 | 4/1988 | Floyd | 43/42.06 |
| 4,744,167 | 5/1988 | Steele | 43/42.06 |
| 4,747,228 | 5/1988 | Giovengo | 43/42.37 |
| 4,875,305 | 10/1989 | Bridges | 43/42.06 |

Primary Examiner—Kurt Rowan
Attorney, Agent, or Firm—Dominik, Stein, Saccocio, Reese, Colitz & Van Der Wall

[57] ABSTRACT

A fish attracting rattling skirted assembly for incorporation in a fishing lure comprising in combination:
  a noise making subassembly comprising;
  a hollow housing;
  an object enclosed within said hollow housing generating fish attracting audible noises;
  a first hollow resilient tube having an outer wall and an inner diameter allowing insertion and retention of said hollow housing into said first hollow resilient tube for promoting an essentially aligned, colinear, longitudinal occupation of an open ended inner space enclosed by an inner wall of said first hollow resilient tube;
  a second hollow resilient tube having an outer wall and open ends and having an open ended space within its inner wall unoccupied and reserved for allowing adaption to the fishing lure; and
  a fish attracting undulation skirt having a waistband allowing evelopment of said fish attracting noise making subassembly, and said second hollow resilient tube.

32 Claims, 2 Drawing Sheets

AUDIBLE FISHING LURE

BACKGROUND OF THE INVENTION

1. Field of the Invention

This invention relates to an assembly for generating audio, olfactory and visual disturbances for attracting fish. The assembly is adapted to be incorporated into a fishing lure, such as a spinner bait, a buzz bait, a jig or the like by the fisherman in the field.

2. Description of the Background Art

Presently, there exist many types of complete fishing lures on the market designed to attract and catch fish. The lures must be purchased as a complete system. Most complete lures depend on a combination of color, noise and movement to attract the fish visually and audibly and to simulate a prospective meal to the attracted fish.

There are many patents granted for fishing lures of various types and design. For example, U.S. Pat. No. 4,747,228 issued to Giovengo, Jr. discloses a complete fishing lure having a hook, a sinker, an eyelet, a plurality of wiggling tails, a closed end hollow capsule with corrugated cylindrical walls, and a plurality of steel balls therein for generating fish attracting noise.

U.S. Pat. No. 3,988,851 issued to Sacharnoski, Sr. discloses a sound making closed end glass capsule containing a plurality of spherical balls therein for generating fish attracting noise. U.S. Pat. No. 4,203,246, a division of U.S. Pat. No. 3,988,851 issued to Sacharnoski, Sr. discloses a fishing lure having an elongated worm-like body of soft flexible material and a sealed glass capsule containing a plurality of noise making metal balls therein. The glass capsule is housed in the elongated soft, flexible, worm-like body.

U.S. Pat. No. 3,802,115 issued to Auten et al. discloses a device for converting a silent fishing lure into a noise making fishing lure by forcing an elongated hollow tube into the body of the worm-like lure thereby creating a cavity. A sealed capsule containing a plurality of shot balls is the inserted into the cavity in the worm-like lure.

None of the above mentioned patents enable the fisherman to adapt the noisemaking and undulation generating assembly to a different type of lure in the field. The fisherman must have a multiplicity of noise making and undulation generating lures adapted for each of the various circumstances he or she might encounter when fishing.

Further none of the above mentioned patents have the ability to receive and release a scent to attract fish.

Therefore, it is an object of this invention to provide an apparatus which overcomes the aforementioned inadequacies of the prior art devices and provides an improvement which is a significant contribution to the advancement of the fishing lure art.

Another object of this invention is to provide an assembly for noise making, scent receiving and releasing and undulation generation for attracting fish that may be readily adapted in the field to a variety of fishing lures by the fisherman depending on the circumstances encountered.

A further object of this invention is to generate visual, olfactory and audio disturbances that will be incorporated into the appropriate fishing lure for attracting fish when deployed and operated underwater by the fisherman.

Another object of this invention is to produce the audio, olfactory and visual disturbance assembly in an easy to manufacture, relatively low cost unit.

Another object of this invention is to utilize water resistant natural products to improve the service life of the assembly.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a novel, simple and inexpensive assembly for producing fish attracting noises, fish attracting scents, and fish attracting undulations. The instant application is adapted to be incorporated into whatever fishing lure the fisherman deems appropriate in the field, such as a spinner bait, a buzz bait, a jig or the like. The invention comprises a fish attracting noise making subassembly, a fish attracting scent receiving and releasing subassembly, a hollow tube for receiving a portion of a fish hook, and a fish attracting undulation skirt. The fish attracting noise making subassembly, the fish attracting scent receiving and releasing subassembly, and the hollow tube are enveloped by the fish attracting undulation skirt to produce a rattling scent releasing skirted assembly that is ready to be adapted by the fisherman to the fishing circumstances in the field, whatever they might be. The undulation skirt is manufactured easily and economically from a single piece of rectangular, thin, water resistant natural material, such as rubber. The waistband of the fish attracting undulation skirt is sized to completely wrap around the fish attracting noise making subassembly, the fish attracting scent releasing and receiving subassembly, and the hollow tube. A plurality of undulation tails disposed in a parallel, spaced-apart relationship depend from the lower edge of the waistband for producing the rhythmic undulations when incorporated into the appropriate fishing lure by the fisherman, deployed underwater, and operated by the fisherman.

The noise making subassembly comprises a first resilient hollow tube and a noisemaking device having a plurality of spherical metal balls contained in a sealed watertight chamber therein. The noisemaking device is fabricated from a tubular, transparent, smooth walled, hard, dense material, such as a pyrex glass. If desired, the walls of the dense material can be rough. The noisemaking device has a plurality of spherical metal balls inserted in the tubular glass from either open end and then both open ends are sealed by heating the ends to the appropriate temperature and crimping each end with a crimping tool to form the sealed watertight chamber.

The fish attracting scent receiving and releasing subassembly comprises an open ended cylinder with a cellular, porous, scent receiving and releasing material inserted within the wall of the open ended cylinder. The ends of the open ended cylinder are crimped after the cellular, porous, scent receiving and releasing material is inserted for allowing retention of the cellular, porous, scent receiving and releasing material.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying o designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
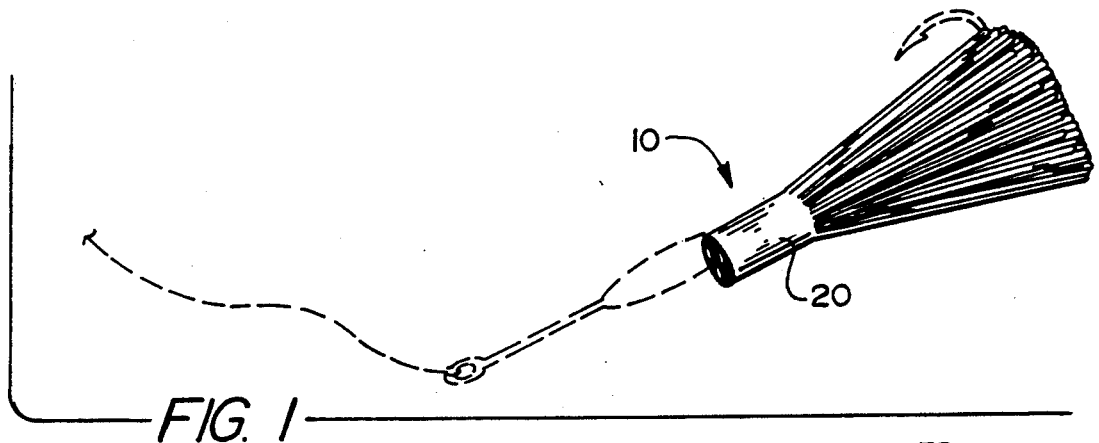
FIG. 1 is a perspective illustration of the instant invention showing the fishing line, the fish lure, and fish hook in phantom.
Figure 2:
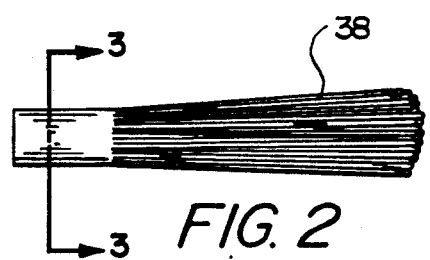
FIG. 2 is an elevation view of the invention.

FIG. 1 is a perspective illustration of the present invention. Referring to FIG. 1, the present invention is a fish attracting rattling scented skirted assembly 10. The assembly is ready for incorporation into a fishing lure such a spinner bait, a buzz bait, a jig, or the like by the fisherman in the field.

The assembly comprises a tubular noise making subassembly 12, a tubular scent receiving and releasing subassembly 14 and a fish hook receiving tube 16, all glued together at a line along their respective outer wall to form a triangular section 18, and an undulation skirt 20 having a waistband 22 for wrapping completely around the formed triangular glued section 18. The assembly is put together in the following steps:

First, a noise making device 24 is inserted into a first hollow resilient tube 26 to form the noise making subassembly 12. The first hollow resilient tube 26 is sized sufficiently to allow resilient insertion of the noise making device 24 and retention of the noise making device 24 within the first hollow resilient tube 26

Second, a cellular, porous scent receiving and releasing material 28 is inserted into an open ended cylinder 30 to form the scent receiving and releasing subassembly 14.

The ends 32A and B of the open ended hollow cylinder 30 may be crimped to urge retention of the cellular, porous scent receiving and releasing material 28.

Figure 3:
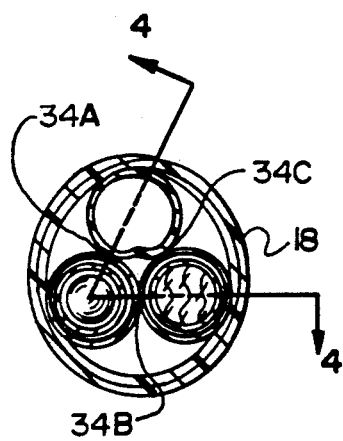
FIG. 3 is a cross sectional view taken along line 3—3 of FIG. 2 showing the triangular shaped section formed by the alignment of the noisemaking subassembly, the scent receiving and releasing subassembly, and the second resilient tube, all enveloped by the undulation skirt.
Figure 4:
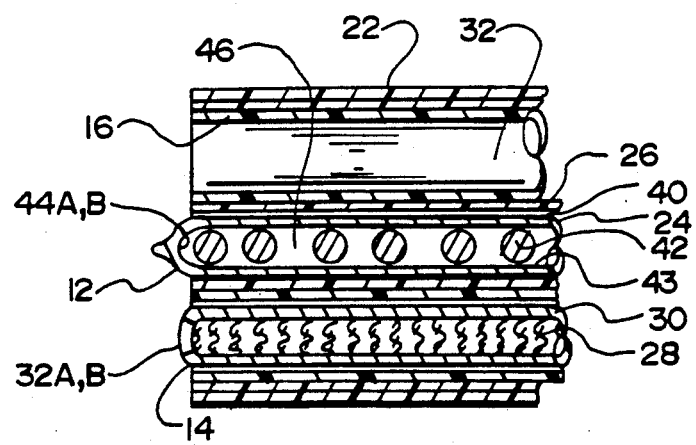
FIG. 4 is an irregular, acute sectional view taken along viewing line 4—4 of FIG. 3 showing the respective interior of the noisemaking subassembly, the scent receiving and releasing subassembly, and the second resilient tube, all enveloped by the undulation skirt.

Third, a second hollow resilient tube 16 having its inner space 32 unoccupied and reserved for receiving a portion of a fish hook (shown in phantom in FIG. 1) is glued to the first hollow resilient tube 26 and the open ended cylinder 30 along their respective outer wall at lines 34A, B, and C to form a triangular shaped section 18 as can best be seen in FIG. 3.

Figure 5:
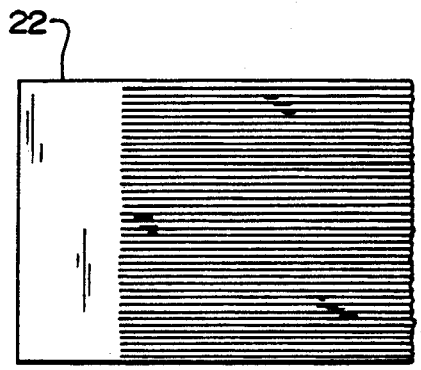
FIGS. 5 through 10 show the method of assembly of the instant application.
Figure 6:
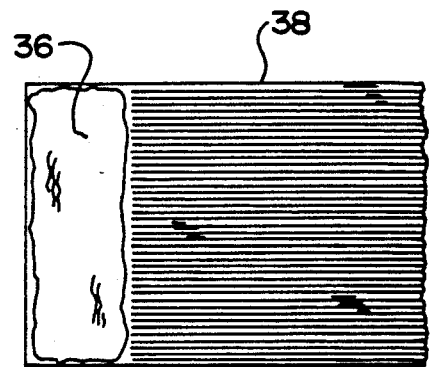
Figure 7:
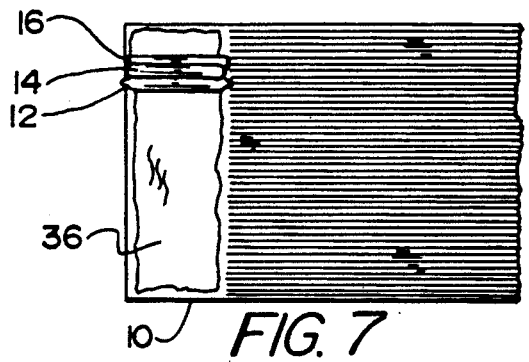
Figure 8:
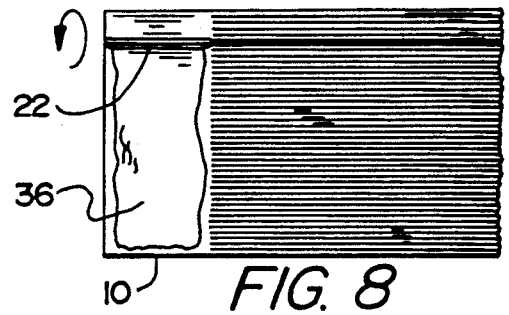
Figure 9:
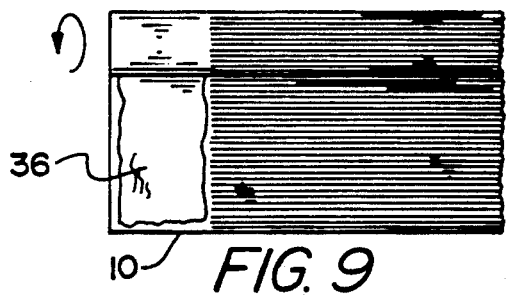
Figure 10:

Finally, a waistband portion 22 of an undulation skirt 20 has glue applied to a side 36 of the waistband 20 as shown in FIGS. 5 and 6 and is glueingly wrapped around the triangular shaped section 18 as best shown in FIGS. 7, 8, and 9, thus completely forming the fish attracting rattling scented skirted assembly 10 as shown in FIG. 10.

A second embodiment can be assembled with only the noisemaking subassembly 12 and the undulation skirt 20 for use in a fishing lure where the circumstances do not require releasing a scent to attract the fish. For this situation, the addition of the scent receiving and releasing subassembly 14 is omitted from the assembly process.

Similarly, a third embodiment can be assembled with only the scent receiving and releasing subassembly 14 and the undulation skirt 20 for use in a fishing lure where the circumstances do not require generating a noise to attract the fish. For this situation, the addition of the noise making subassembly 12 is omitted from the assembly process.

In use in operation, the fisherman would determine the embodiment of the invention that is proper for attracting and catching the fish. The fisherman would then select the appropriate assembly and insert a portion of the fish hook into the second hollow resilient tube 16 (see FIG. 1). If the scent receiving and releasing assembly 14 was chosen, the fisherman would also deposit a measure of a liquid scent on the cellular, porous scent receiving and releasing material 28 through an end 32 of the open ended cylinder 30.

The undulation skirt 20 is made from a water resistant natural material, preferably rubber. The waistband 22 of the undulation skirt 20 has a width slightly greater than the length of the fish attracting noise making subassembly 12 or the scent receiving and releasing subassembly 14 and a length sufficient to wrap around the perimeter of the glued triangular shaped section 18. A plurality of tails 38 of the fish attracting undulation skirt 20 are disposed in a parallel, spaced-apart relationship to generate fish attracting harmonious undulations of the plurality of tails 38 when the entire assembly 10 is adapted to a particular lure and pulled through the water by the fisherman. The plurality of tails 38 have a length sufficient for allowing economic and easy manufacture of the undulation skirt 20 from a rectangular piece of thin, water resistant, natural material, preferably rubber.

The fish attracting noise making subassembly 12 comprises a first hollow resilient tube 26 and a sealed, hollow noisemaking cylinder 24 inserted through either end of the first hollow resilient tube 26. The sealed, hollow noisemaking cylinder 24 occupies the space within the inner wall 40 of the first hollow resilient tube 26. The inner diameter of the first hollow resilient tube 26 is sized to be slightly smaller than the outer diameter of the sealed, hollow noisemaking cylinder 24. This slight difference in diameters allows resilient insertion of the sealed hollow noisemaking cylinder 24 into the first hollow resilient tube 26 and further, allows retention of the sealed hollow noisemaking cylinder 24 within the first hollow resilient tube 26 during use and operation. The sealed hollow noisemaking cylinder 24 is fabricated from a length of water resistant, tubular, hard, smooth-walled, transparent material, preferably pyrex glass. Prior to the sealing operation, a plurality of solid spherical metal balls 42 are inserted through either end 44 of the length of tubular, hard, smooth walled, transparent material. The balls 42 are sized to roll freely along the length of the sealed hollow noisemaking cylinder 24 for making bumping contact with the smooth inner wall 43 of the sealed hollow noisemaking cylinder 24 and further, for making rolling contact with each other. Then, both ends 44A and B of the length of tubing are heated to the proper temperature and sealed by a crimping tool to form the aforementioned sealed hollow noisemaking cylinder 24 having a watertight chamber 46 with a plurality of the solid spherical metal balls 42 therein. If desired, the sealed hollow noisemaking cylinder 24 may be fabricated from a length of water resistant, tubular, hard, rough walled transparent material to increase the frequency of the noise generation produced by the sealed hollow noisemaking cylinder 24.

Since the fish attracting noise is produced by the movement of the solid spherical metal balls 42 when contacting each other and also when contacting the inner wall 43 of the sealed noisemaking hollow cylinder 24, the diameter and number of solid spherical metal balls 42 in the watertight chamber is relevant to the overall effectiveness of the fish attracting noise making subassembly 12. The watertight chamber 46 may be sized to have negligible or no buoyant effect on the entire assembly 10. The solid spherical metal balls 42 enclosed within the watertight chamber 46 may be sized to have negligible or no ballast effect on the entire assembly 10.

The second hollow resilient tube 16 is joined to the first hollow resilient tube 26 longitudinally at a line 34A along their respective outer walls. Also, the scent receiving and releasing subassembly 14 is joined longitudinally a lines 34B and 34C along its respective outer wall to the resilient hollow tubes 26 and 16, respectively, thereby forming a triangular shaped section 18 as best seen in FIG. 3.

The entire fish attracting scented rattling skirt assembly 10 is adapted to be incorporated into any type of fishing lure deemed appropriate by the fisherman in the field.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

Now that the invention has been described,
What is claimed is:

1. A fish attracting rattling scented skirted assembly for incorporation in a fishing lure comprising in combination:
   a noise making subassembly comprising:
   a hollow housing,
   an object enclosed within said hollow housing generating fish attracting audible noises,
   a first hollow resilient tube having an outer wall and an inner diameter allowing insertion and retention of said hollow housing into said first hollow resilient tube for promoting an essentially aligned, colinear, longitudinal occupation of an open ended inner space enclosed by an inner wall of said first hollow resilient tube;
   a second hollow resilient tube having an outer wall and open ends and an open ended space within its inner wall unoccupied and reserved for allowing adaption to the fishing lure;
   a fish attracting scent receiving and releasing subassembly comprising,
   a material for receiving a fish attracting scented liquid and releasing the fish attracting scented liquid,
   an open ended cylinder having an outer wall and adapted to receive and retain said material and further adapted to release the fish attracting scented liquid through a trailing end of said open ended cylinder; and
   a fish attracting undulation skirt having a waistband allowing evelopment of said fish attracting noise making subassembly, said fish attracting scent receiving and releasing subassembly, and said second hollow resilient tube.

2. A fish attracting rattling scented skirted assembly as recited in claim 1 wherein said hollow housing is transparent and cylindrical.

3. A fish attracting rattling scented skirted assembly as recited in claim 2 wherein said hollow housing further includes closed sealed ends forming a sealed chamber.

4. A fish attracting rattling scented skirted assembly as recited in claim 3 wherein said object enclosed within said hollow housing comprises a solid spherical metal ball.

5. A fish attracting rattling scented skirted assembly as recited in claim 1 wherein said first hollow resilient tube includes two open ends.

6. A fish attracting rattling scented skirted assembly as recited in claim 1 wherein said second hollow resilient tube includes a length substantially equal to a length of said first hollow resilient tube.

7. A fist attracting rattling scented skirted assembly as recited in claim 1 wherein said material is porous and cellular.

8. A fish attracting rattling scented skirted assembly as recited in claim 1 and further including means for glueing attachment of said first hollow resilient tube, said second hollow resilient tube, and said open ended cylinder along a ling on a periphery of each said respective outer wall.

9. A fish attracting rattling scented skirted assembly as recited in claim 1 wherein said waistband has a width substantially equal to said length of said first hollow resilient tube allowing complete coverage of said fish attracting noisemaking subassembly, said fish attracting scented receiving and releasing subassembly and said second hollow resilient tube.

10. A fish attracting rattling scented skirted assembly as recited in claim 9 wherein said skirt includes a plurality of tails disposed in a parallel, spaced-apart relationship depending outwardly from a lower edge of said waistband for producing a fish attracting undulation when deployed underwater by a fisherman.

11. A fish attracting rattling scented skirted assembly as recited in claim 10 wherein each said tail has a length substantially equal to said length of said waistband.

12. A method for providing a fish attracting rattling scented skirted assembly for incorporation in a fish lure comprising the steps of:
inserting a noisemaking device into a first hollow resilient tube;
inserting a material into an open ended cylinder;
applying glue to a first side of a waistband portion of an undulation skirt;
gluingly wrapping said waistband portion of said undulation skirt completely around said resilient hollow tube and said open ended cylinder.

13. A method for providing a fish attracting rattling scented skirted assembly as recited in claim 12 and further comprising the step of adhering said first hollow resilient tube and said open ended cylinder to a second hollow resilient tube, prior to the step of applying glue to said first side of said waistband of said undulation skirt.

14. A fish attracting rattling skirted assembly for incorporation in a fishing lure comprising in combination:
a noise making subassembly comprising;
a hollow housing,
an object enclosed within said hollow housing generating fish attracting audible noises,
a first hollow resilient tube having an outer wall and an inner diameter allowing insertion and retention of said hollow housing into said first hollow resilient tube for promoting an essentially aligned, co-linear, longitudinal occupation of an open ended inner space enclosed by an inner wall of said first hollow resilient tube;
a second hollow resilient tube having an outer wall and open ends and having an open ended space within its inner wall unoccupied and reserved for allowing adaption to the fishing lure; and
a fish attracting undulation skirt having a waistband allowing evelopment of said fish attracting noise making subassembly, and said second hollow resilient tube.

15. A fish attracting rattling skirted assembly as recited in claim 14 wherein said hollow housing is transparent and cylindrical.

16. A fish attracting rattling skirted assembly as recited in claim 15 wherein said hollow housing further includes closed sealed ends forming a sealed chamber.

17. A fish attracting rattling skirted assembly as recited in claim 16 wherein said object enclosed within said hollow housing comprises a solid spherical metal ball.

18. A fish attracting rattling skirted assembly as recited in claim 14 wherein said first hollow resilient tube includes two open ends.

19. A fish attracting rattling skirted assembly as recited in claim 14 wherein said second hollow resilient tube includes a length substantially equal to a length of said first hollow resilient tube.

20. A fish attracting rattling skirted assembly as recited in claim 14 and further including means for glueing attachment of said first hollow resilient tube and said second hollow resilient tube, along a line on a periphery of each said respective outer wall.

21. A fish attracting rattling skirted assembly as recited in claim 14 wherein said waistband has a width substantially equal to said length of said first hollow resilient tube allowing complete coverage of said fish attracting noisemaking subassembly, and said second hollow resilient tube.

22. A fish attracting rattling skirted assembly as recited in claim 21 wherein said skirt includes a plurality of tails disposed in a parallel, spaced-apart relationship depending outwardly from a lower edge of said waistband for producing a fish attracting undulation when deployed underwater by a fisherman.

23. A fish attracting rattling skirted assembly as recited in claim 22 wherein each said tail has a length substantially equal to said length of said waistband.

24. A method for providing a fish attracting rattling skirted assembly for incorporation in a fish lure comprising the steps of:
inserting a noisemaking device into a first hollow resilient tube; adhering said first hollow resilient tube to a second hollow resilient tube;
applying glue to a first side of a waistband portion of an undulation skirt;
gluingly wrapping said waistband portion of said undulation skirt completely around said hollow resilient tube.

25. A fish attracting scented skirted assembly for incorporation in a fishing lure comprising in combination:
a hollow resilient tube comprising an outer wall and an open ended space within its inner wall unoccupied and reserved for allowing adaption to the fishing lure;
a fish attracting scent receiving and releasing subassembly comprising,
a material for receiving a fish attracting scented liquid and releasing the fish attracting scented liquid,
an open ended cylinder having an outer wall and adapted to receive and retain said material and further adapted to release the fish attracting scented liquid through a trailing end of said open ended cylinder; and
a fish attracting undulation skirt having a waistband allowing evelopment of said said fish attracting scent receiving and releasing subassembly, and said hollow resilient tube.

26. A fish attracting scented skirted assembly as recited in claim 25 wherein said hollow resilient tub includes two open ends.

27. A fish attracting scented skirted assembly as recited in claim 25 wherein said material is porous and cellular.

28. A fish attracting scented skirted assembly as recited in claim 25 and further including means for glueing attachment of said hollow resilient tube, and said open ended cylinder along a line on a periphery of each said respective outer wall.

29. A fish attracting scented skirted assembly as recited in claim 25 wherein said waistband has a width substantially equal to said length of said hollow resilient tube allowing complete coverage of said fish attracting scented receiving and releasing subassembly and said hollow resilient tube.

30. A fish attracting scented skirted assembly as recited in claim 29 wherein said skirt includes a plurality of tails disposed in a parallel, spaced-apart relationship depending outwardly from a lower edge of said waistband for producing a fish attracting undulation when deployed underwater by a fisherman.

31. A fish attracting scented skirted assembly as recited in claim 30 wherein each said tail has a length substantially equal to said length of said waistband.

32. A method for providing a fish attracting scented skirted assembly for incorporation in a fish lure comprising the steps of:

inserting a material into an open ended cylinder; adhering said open ended cylinder to a hollow resilient tube;

applying glue to a first side of a waistband portion of an undulation skirt;

gluingly wrapping said waistband portion of said undulation skirt completely around said open ended cylinder.

* * * * *